(12) United States Patent
Gong et al.

(10) Patent No.: US 7,489,316 B2
(45) Date of Patent: Feb. 10, 2009

(54) METHOD FOR FRAME RATE CONVERSION

(75) Inventors: Jin Sheng Gong, Longtan Township, Taoyuan County (TW); Yu Pin Chou, Tongsiao Township, Miaoli County (TW); Shiu Rong Tong, Kaohsiung (TW)

(73) Assignee: Realtek Semiconductor Corp. (TW)

( * ) Notice: Subject to any disclaimer, the term of this patent is extended or adjusted under 35 U.S.C. 154(b) by 517 days.

(21) Appl. No.: 11/222,899

(22) Filed: Sep. 8, 2005

(65) Prior Publication Data
US 2006/0050075 A1    Mar. 9, 2006

(30) Foreign Application Priority Data
Sep. 8, 2004    (TW) ............................... 93127094 A

(51) Int. Cl.
*G09G 5/399*    (2006.01)
*G06F 13/372*    (2006.01)

(52) U.S. Cl. ....................................... 345/539; 345/534
(58) Field of Classification Search ................. 345/539, 345/534
See application file for complete search history.

(56) References Cited

U.S. PATENT DOCUMENTS 5,808,629 A * 9/1998 Nally et al. .................. 345/539

* cited by examiner

*Primary Examiner*—Ryan R Yang

(57) ABSTRACT

A method for converting a frame rate of a video signal comprising a data enable signal by means of a first buffer and a second buffer is disclosed. The method comprises: alternatively accessing the first buffer and the second buffer according to a first frame rate; determining an accessing time point of the first and the second buffers according to the data enable signal; and accessing the buffer, which is one of the first and the second buffers and not accessed at the accessing time point, according to a second frame rate, wherein the second frame rate is faster than the first frame rate.

16 Claims, 4 Drawing Sheets

METHOD FOR FRAME RATE CONVERSION

BACKGROUND OF THE INVENTION (a). Field of the Invention

This invention is related to the field of frame rate conversion, and especially to the method for frame rate conversion using two buffers.

(b). Description of the Prior Arts

For a display device, such as a CRT or LCD display, frame rate conversion (FRC) is needed when the input frame rate is different from the output frame rate that the display supports, or when two different sources of input frame are to be outputted jointly in one output frame rate. The frame rate, in this aspect, is defined as the number of frames being processed in a unit time. For example, in a commonly used personal computer system, frame rate conversion is needed because the input frame rate from the display card (e.g. VGA card) to the display might be different from the refresh frequency of the display device (i.e. the output frame rate of the display device, which is usually set at 60 Hz). FIG. 1A is a diagram illustrating frame rate conversion. In FIG. 1A, in the aspect of inputting, the display writes a frame into a buffer at each clock period of an input vertical synchronization (v-sync) signal; in the aspect of outputting, the display reads a frame from the buffer at each clock period of an output v-sync signal. In FIG. 1A, the oblique line region represents the part of a frame that actually contains image data, while the porch does not contain any image data. Due to the difference in the input and output frame rates (the period for the input v-sync signal is different from that of the output v-sync signal), frame rate conversion is needed.

A frame buffer is usually used to temporarily store the frame data when frame rate conversion is performed. However, this practice is prone to frame tearing, that is, the top and bottom parts of an actual displayed frame contain image data belonged to different frames. The frame tearing is due to the limited space of the frame buffer. When the difference between the rates of inputting/outputting frame data to/from the buffer is larger than a certain level, either the currently inputted or outputted frame will chase to surpass the previous frame data.

The conventional method for solving this problem is to make use of two frame buffers (denoted as the first and the second buffers). Each frame buffer can store one frame. FIG. 1B is a diagram illustrating the conventional method for solving the problem of frame tearing. It is assumed in this figure that the input frame rate is slower than the output frame rate for the display. The "BUF 1" or "BUF 2" in each oblique line region shows that the region is accessed from the first buffer or the second buffer. The characteristic of the conventional method is that the switching and selection of the buffer is made according to the pulse of the v-sync signal, and the time points of switching and selection are shown by the arrows in FIG. 1B.

However, this conventional method cannot totally avoid the problem of frame tearing. Since the time points of switching and selection are determined according to the pulses of the v-sync signal, it is still inevitable to have the same buffer being read out and write to at the same time, e.g. as shown by the oblique line regions 11-12 and 13-14 in FIG. 1B.

SUMMARY OF THE INVENTION

It is therefore one of objectives of this invention to provide a method for frame rate conversion in order to provide a better time point for switching and selecting the buffer to avoid the above mentioned problem.

According to an embodiment of this invention, a method for converting a frame rate of a video signal is provided. The video signal includes video data, a v-sync signal and a data enable signal. The method comprises: alternatively accessing a first buffer and a second buffer according to a first frame rate; and accessing the buffer, which is one of the first and the second buffers and not accessed at a time point, according to a second frame rate, wherein the second frame rate is faster than the first frame rate, and the time point is in between the data enable signal and the v-sync signal.

DETAILED DESCRIPTION OF THE INVENTION

In an embodiment of this invention, the buffer-switching time point lies in between the ending of the data enable signal and the starting of the v-sync signal, and the buffer-selecting time point lies in between the ending of the v-sync signal and the starting of the data enable signal. This embodiment performs the conversion between two different frame rates by utilizing two buffers alternatively to access frame data.

As mentioned later, with the design of the buffer-switching time point (for the slow frame rate, this lies in between the ending of the data enable signal and the starting of the v-sync signal) and the buffer-selecting time point (for the fast frame rate, this lies in between the ending of the v-sync signal and the starting of the data enable signal), the frame tearing problem can be effectively avoided. For the rest of this specification, the two different frame rates will be referred to as the first frame rate and the second frame rate, with the assumption that the first frame rate is slower than the second one. Also, the two buffers used will be referred to as the first buffer and the second buffer.

In one embodiment, the first and second buffers are alternately written in (or read out) according to the slower first frame rate, and it depends on which buffer is being utilized with the first frame rate that which buffer is to be read out (or written in) with the faster second frame rate. If none of the buffers is in use at this moment, then the choice of buffer will depend on which buffer is most recently being utilized with the first frame rate. To be specific, if the first buffer is being accessed with the first frame rate before starting to access a frame with the second frame rate, the second buffer will be selected for accessing the frame, and vice versa. If none of the buffers is in use at this moment, the most recent buffer accessed with the first frame rate will be selected for accessing the frame.

Figure 1A:
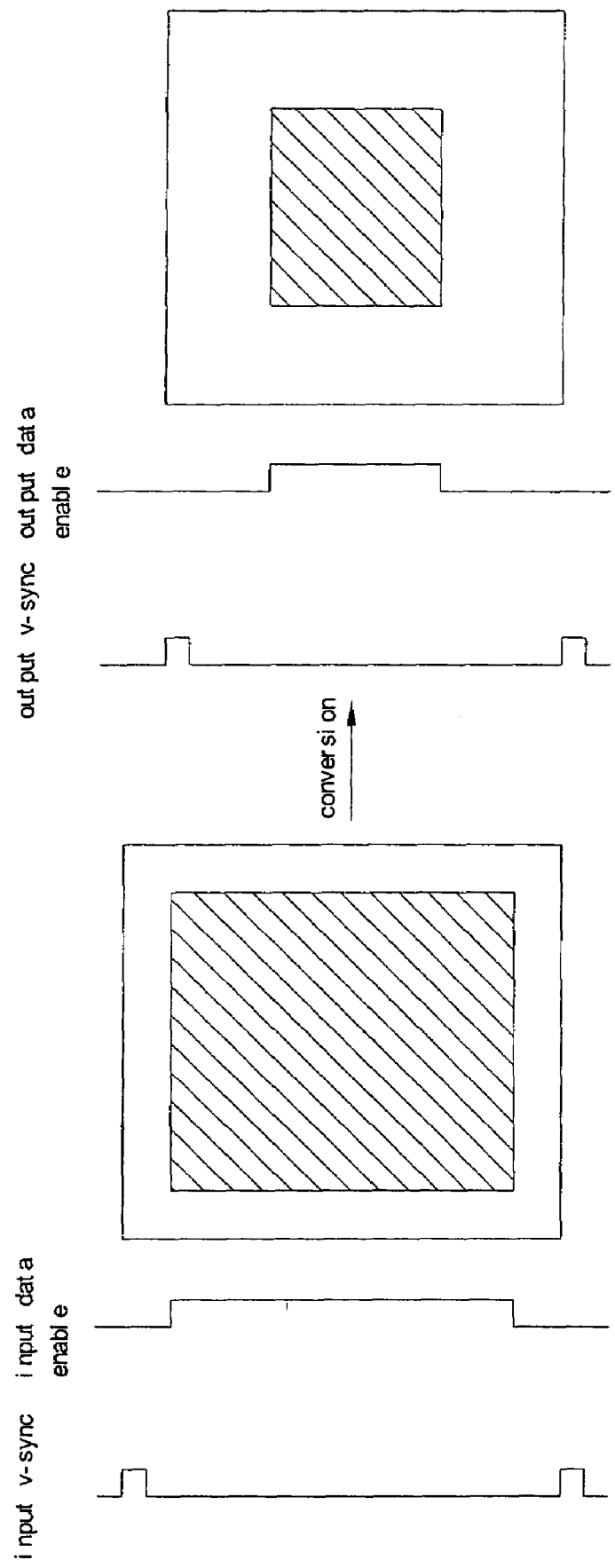
FIG. 1A is a diagram illustrating frame rate conversion.
Figure 1B:
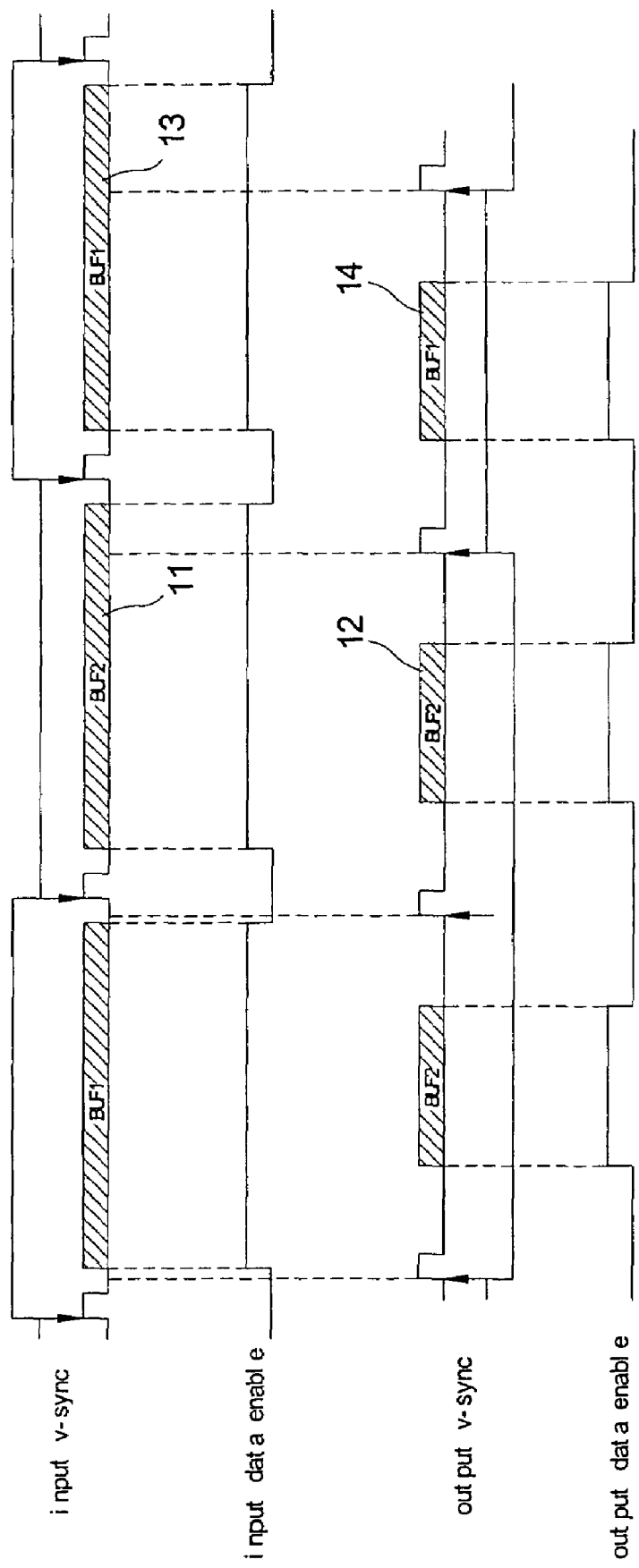
FIG. 1B is a diagram illustrating the conventional method for solving the problem of frame tearing.
Figure 2:
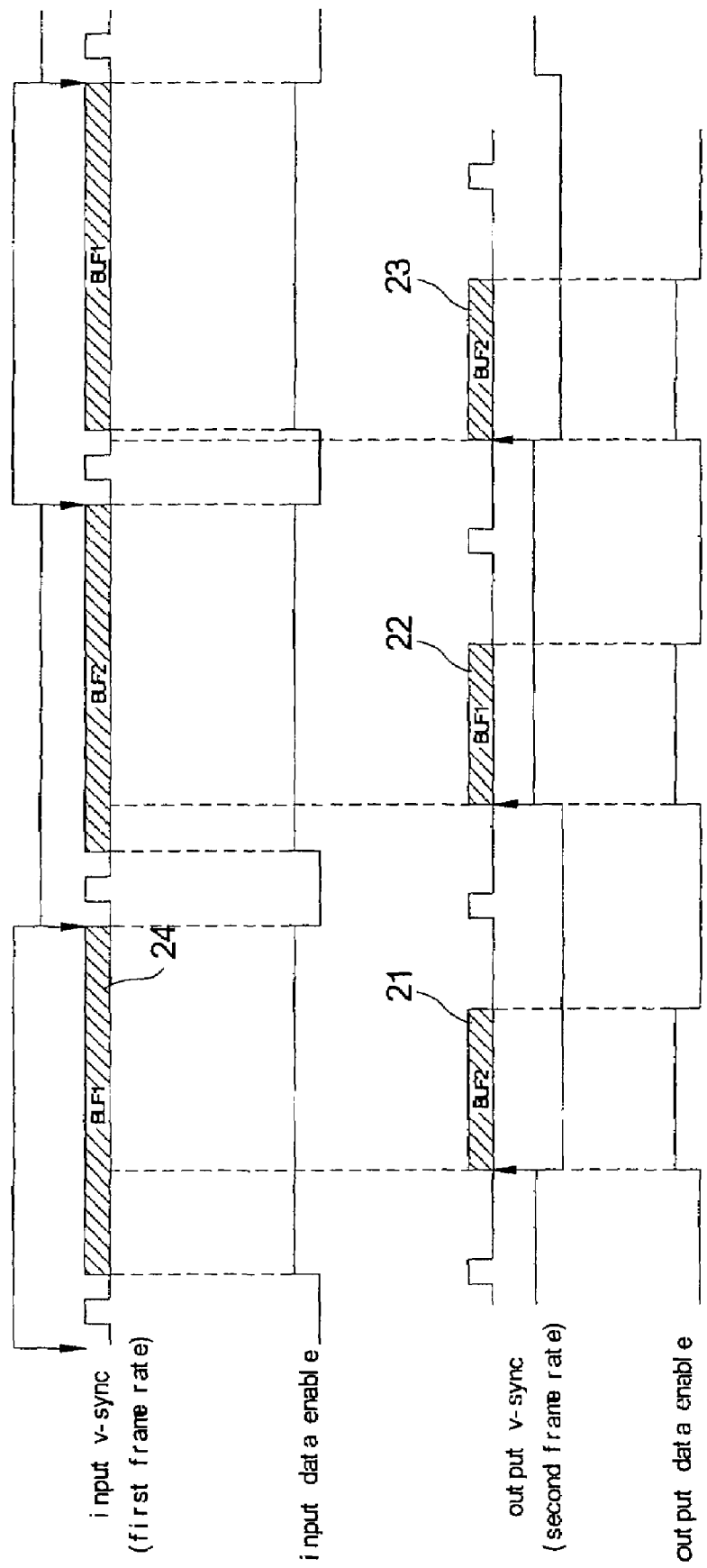
FIG. 2 is a diagram of a preferred embodiment of the method for frame rate conversion according to this invention.

FIG. 2 is a diagram of a preferred embodiment of the method for frame rate conversion according to this invention.

In this embodiment, the first and second frame rates represent an input frame rate and an output frame rate of a display device respectively. The display device can be a CRT display or a LCD display.

In the embodiment of FIG. 2, the switching of the buffer happens before the starting of the input v-sync signal. After a frame is inputted to the first buffer (i.e. the time point when the input data enable signal ends, e.g. as shown by the arrow at the end of the oblique line region 24 in FIG. 2), the second buffer is immediately switched to before the next input v-sync signal appears. Thus, the next inputted frame would be stored in the second buffer. At the ending of the input data enable signal for the next frame, the first buffer will be switched to again, and so on and so forth.

According to this embodiment, at the beginning of outputting a frame (that is, at the starting of the output data enable signal, e.g. as shown by the arrow at the start of the oblique line region 21 in FIG. 2), the input status will be checked in order to select an appropriate buffer for outputting. As shown in FIG. 2, there are three possible kinds of selection:

(1) If the first buffer is receiving input data at the first frame rate, the second buffer will be selected to output its stored frame, e.g. as shown by the oblique line region 21.

(2) If the second buffer is receiving input data at the first frame rate, the first buffer will be selected to output its stored frame, e.g. as shown by the oblique line region 22.

(3) If none of the buffers is receiving input data at the moment, the most recent buffer receiving input data will be selected for outputting. Since this is the moment when the input of the previous frame has been finished and the input of the next frame has not yet been started, and since, as mentioned before, the buffer will be switched as soon as the input of a frame is finished, the buffer for inputting will be switched to the buffer not which receives input data most recently (though the input of another frame has not yet been started at this time). Thus, the buffer receiving input data most recently will be selected for outputting. For example, as shown by the oblique line region 23, at the beginning of outputting, the second buffer is the most recent buffer receiving input data, so the second buffer is selected for outputting.

In one embodiment, a buffer-switching bit is used to indicate which buffer is currently switched to for inputting at the slower first frame rate. After a frame is inputted to a buffer at the first frame rate, this buffer-switching bit will be updated to indicate another buffer. As a frame is to be outputted at the faster second frame rate, the buffer-switching bit is examined, and the buffer different from that for the first frame rate is selected for outputting.

Figure 3:
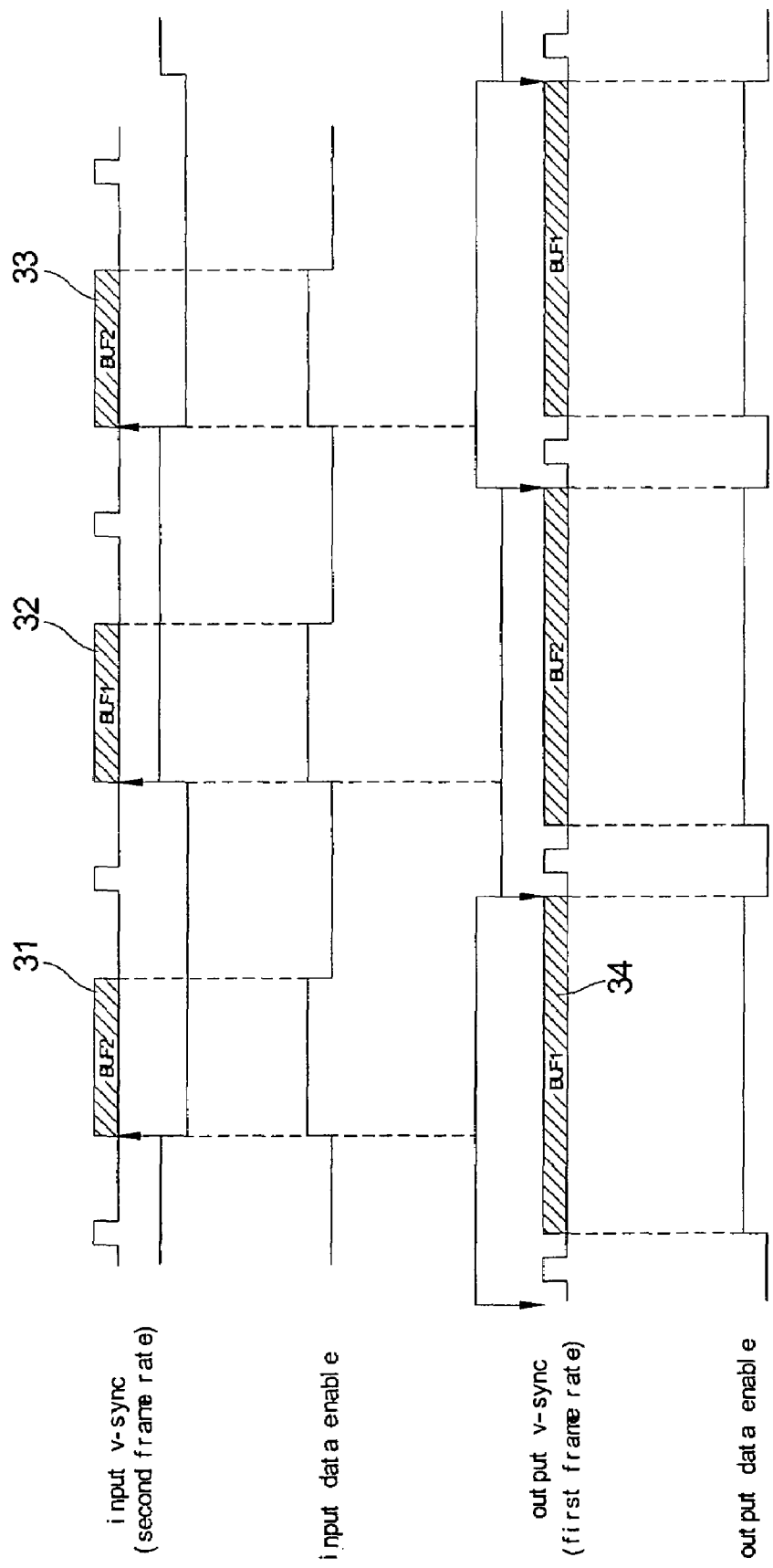
FIG. 3 is a diagram of another preferred embodiment of the method for frame rate conversion according to this invention.

FIG. 3 is a diagram of another preferred embodiment of the method for frame rate conversion according to this invention. This embodiment is mostly similar to that of FIG. 2. The difference is that, in FIG. 3, the first and second frame rates represent an output frame rate and an input frame rate of a display device respectively In this embodiment, the switching of the buffers happens before the starting of the output v-sync signal. After a frame is outputted from one buffer (i.e. the ending of the output data enable signal, e.g. as shown by the arrow at the end of the oblique line region 34 in FIG. 3), another buffer is immediately switched to. At the beginning of inputting a frame (i.e. at the starting of the input data enable signal, e.g. as shown by the arrow at the start of the oblique line region 31 in FIG. 3), the output status will be checked in order to select an appropriate buffer for inputting. Similar to the embodiment in FIG. 2, there are also three kinds of selection in FIG. 3:

(1) If the first buffer is outputting frame data at the first frame rate, the second buffer is selected for inputting, e.g. as shown by the oblique line region 31.

(2) If the second buffer is outputting at the first frame rate, the first buffer is selected for inputting, e.g. as shown by the oblique line region 32.

(3) If none of the buffers is outputting at the moment, the most recent buffer outputting frame data will be selected for inputting. For example, as shown by the oblique line region 33, at the beginning of inputting, the first buffer is the most recent buffer outputting frame data, so the first buffer is selected for inputting.

In one embodiment, a buffer-switching bit is used to indicate which buffer is currently switched to for outputting at the slower first frame rate. The manner of operation is similar to the buffer-switching bit mentioned in the embodiment of FIG. 2, and will not be described again here.

In the embodiments of FIGS. 2 and 3, the buffer is switched at the end of the actual access of a certain frame with the slower frame rate (i.e., at the ending of the data enable signal). In this way, when none of the buffers is being accessed, the most recent buffer being accessed with the slower frame rate can be selected for accessing with the faster frame rate, thereby preventing from frame tearing. In addition, since the selection of buffer is made for the faster frame rate at the start of accessing a certain frame (that is, at the starting of the data enable signal), the probability of selecting the wrong buffer can be effectively lower down.

In another embodiment of this invention, the data enable signal of the slower first frame rate is used to determine which of the first and second buffers is to be accessed at the faster second frame rate. There are also three kinds of selection for this case: (1) if the first buffer is being written to (or read from) with the slower first frame rate, the second buffer will be read from (or written to) with the second frame rate; (2) if the second buffer is being written to (or read from) with the slower first frame rate, the first buffer will be read from (or written to) with the second frame rate; and (3) if none of the first and second buffers is being accessed by the slower first frame rate, either the first buffer or the second buffer is arbitrarily selected for accessing with the second frame rate. Since the second frame rate is faster than the first frame rate, it will not occur that the frame data accessed with the first frame rate will surpass that accessed with the second frame rate.

While the present invention has been shown and described with reference to the preferred embodiments thereof and in terms of the illustrative drawings, it should not be considered as limited thereby. Various possible modifications and alterations could be conceived of by one skilled in the art to the form and the content of any particular embodiment, without departing from the scope and the spirit of the present invention.

What is claimed is:

1. A method for converting a frame rate of a video signal comprising video data, the method comprising:

alternatively accessing a first buffer and a second buffer according to a first frame rate; and alternatively accessing the first buffer and the second buffer according to a second frame rate, wherein the second frame rate is faster than the first frame rate;

wherein a first time point for switching the first buffer and the second buffer according to the first frame rate is after an ending of a first data enable signal and before a next starting of a first vertical synchronization signal; and a second time point for switching the first buffer and the second buffer according to the second frame rate is after an ending of a second vertical synchronization signal and before a starting of a second data enable signal.

2. The method of claim 1, wherein in the step of alternatively accessing the first buffer and the second buffer according to the second frame rate, the second buffer is accessed according to the second frame rate when the first buffer is accessed at the second time point.

3. The method of claim 1, wherein the first and the second frame rates are an input frame rate and an output frame rate of a display device, respectively.

4. The method of claim 3, wherein the step of alternatively accessing the first and the second buffers according to the first frame rate comprises: alternatively inputting a plurality of frames to the first and the second buffers according to the first frame rate.

5. The method of claim 3, wherein the step of alternatively accessing the first buffer and the second buffer according to the second frame rate comprises: alternatively outputting a plurality of frames from the first and the second buffers according to the second frame rate.

6. The method of claim 1, wherein the first and the second frame rates are an output frame rate and an input frame rate of a display device, respectively.

7. The method of claim 6, wherein the step of alternatively accessing the first buffer and the second buffer according to the second frame rate comprises: alternatively inputting a plurality of frames to the first and the second buffers according to the second frame rate.

8. The method of claim 6, wherein the step of alternatively accessing the first and the second buffers according to the first frame rate comprises: alternatively outputting a plurality of frames from the first and the second buffers according to the first frame rate.

9. The method of claim 1, wherein the step of alternatively accessing the first buffer and the second buffer according to the first frame rate comprises updating a buffer-switching bit at the first time point to indicate which buffer is currently switched for accessing according to the first frame rate; and the step of alternatively accessing the first buffer and the second buffer according to the second frame rate comprises examining the buffer-switching bit at the second time point.

10. A method for converting a frame rate of a video signal by means of a first buffer and a second buffer, the method comprising:
  alternatively accessing the first buffer and the second buffer according to a first frame rate;
  alternatively accessing the first buffer and the second buffer according to a second frame rate, wherein the second frame rate is faster than the first frame rate;
  wherein a first time point for switching the first buffer and the second buffer is determined according to a first data enable signal for the first frame rate; and a second time point for switching the first buffer and the second buffer is determined according to a second data enable signal for the second frame rate.

11. The method of claim 10, wherein in the step of alternatively accessing the first buffer and the second buffer according to the second frame rate, the second buffer is accessed according to the second frame rate when the first buffer is accessed at the second time point.

12. The method of claim 10,
  wherein the first and the second frame rates are an input frame rate and an output frame rate of a display device, respectively; and
  wherein the step of alternatively accessing the first and the second buffers according to the first frame rate comprises: alternatively inputting a plurality of frames to the first and the second buffers according to the first frame rate.

13. The method of claim 10,
  wherein the first and the second frame rates are an input frame rate and an output frame rate of a display device, respectively; and
  wherein the step of alternatively accessing the first buffer and the second buffer according to the second frame rate comprises: alternatively outputting a plurality of frames from the first and the second buffers according to the second frame rate.

14. The method of claim 10,
  wherein the first and the second frame rates are an output frame rate and an input frame rate of a display device, respectively; and
  wherein the step of alternatively accessing the first and the second buffers according to the first frame rate comprises: alternatively outputting a plurality of frames from the first and the second buffers according to the first frame rate.

15. The method of claim 10,
  wherein the first and the second frame rates are an output frame rate and an input frame rate of a display device, respectively; and
  wherein the step of alternatively accessing the first buffer and the second buffer according to the second frame rate comprises: alternatively inputting a plurality of frames to the first and the second buffers according to the second frame rate.

16. The method of claim 10, wherein the step of alternatively accessing the first buffer and the second buffer according to the first frame rate comprises updating a buffer-switching bit at the first time point to indicate which buffer is currently switched for accessing according to the first frame rate; and the step of alternatively accessing the first buffer and the second buffer according to the second frame rate comprises examining the buffer-switching bit at the second time point.

* * * * *